United States Patent
Kruiger

[15] 3,686,959
[45] Aug. 29, 1972

[54] METHOD AND APPARATUS FOR DETERMINING THE RELATIVE PROPORTIONS BY WEIGHT OF ASPHALT COMPONENTS

[72] Inventor: Kornelis Kruiger, Harde, Netherlands

[73] Assignee: N.V. Offringa, Harde, Netherlands

[22] Filed: Feb. 9, 1971

[21] Appl. No.: 113,943

[30] Foreign Application Priority Data

Feb. 26, 1970  Netherlands..............7002729

[52] U.S. Cl.............................73/432 R, 73/432 PS
[51] Int. Cl............................................G01n 15/00
[58] Field of Search.......................73/432 R, 432 PS

[56] References Cited

UNITED STATES PATENTS

| | | | |
|---|---|---|---|
| 3,524,353 | 8/1970 | Bors | 73/432 PS |
| 2,264,223 | 11/1941 | Stancliffe | 73/432 PS |
| 3,203,253 | 8/1965 | Scheid | 73/432 PS |

*Primary Examiner*—S. Clement Swisher
*Attorney*—Snyder and Butrum

[57] ABSTRACT

A method and an apparatus to determine the relative proportions by weight of the components of an asphalt sample, in which successively the sample is weighed, the gravel with mortar and bitumen adhering thereto is separated from said sample, said dirty gravel is washed, a small part of the rest of the sample is treated to separate the bitumen therefrom and both the bitumenless rest of said sample part and the washed gravel are weighed.

2 Claims, 4 Drawing Figures

INVENTOR
KORNELIS KRUGER

METHOD AND APPARATUS FOR DETERMINING THE RELATIVE PROPORTIONS BY WEIGHT OF ASPHALT COMPONENTS

The invention relates to a method for determining the relative proportions by weight of the components of an asphalt sample, and to an apparatus for the performance of the method. To ensure high-quality asphalt production the relative proportions by weight of the asphalt components must be accurately controlled. To control the metering of the components, therefore, it is important to determine the asphalt composition by samples and analysis thereof. Since asphalt is inhomogeneous, the sample must be very large to be representative. For the analysis of a sample of this kind extraction methods are used which are laid down in various regulations published by the "Rijkswaterstaat" (National Department of Public Works).

It is also known to determine asphalt composition by representative random sampling. However, due to the inhomogeneity of asphalt a large number of samples must be taken, even if they are fairly small. The prior art methods have a number of disadvantages. Some of the methods are very time-wasting, while others need a large number of samples.

Clearly it is practically impossible to control the production process with such a long interval between taking the sample and getting to know the results. Incidentally asphalt production of 100 tons per hour can be regarded as normal.

It is an object of the invention to provide a method of analyzing an asphalt sample very simply and rapidly.

To this end the method according to the invention comprises the following steps: weighing the sample; separating from the sample the gravel with the mortar and bitumen adhering thereto; washing the gravel with a solvent; taking a partial sample from the remainder of the sample; separating the bitumen from the partial sample by extraction; and weighing the gravel and the remainder of the partial sample. The invention is based on the fact (confirmed by tests) that of the asphalt components — gravel, sand + filler (mortar) and bitumen — the bitumen is unevenly distributed through the gravel and mortar. It has been found that through the range over which asphalt can be processed the mortar absorbs ten times as much bitumen as the gravel. The percentage by weight of bitumen in the mortar is therefore always an indication of the relative proportions by weight of the gravel, sand and bitumen in the asphalt. The realisation that this fixed correlation exists enabled the method according to the invention to be developed. A very large representative sample can now be taken and the initial removal of the gravel causing the inhomogeneity of the mixture enables a small partial sample of the remaining homogeneous mixture of mortar and bitumen to be taken and analyzed by a known extraction method, thus determining the bitumen content of the mixture of mortar and bitumen. The relative proportion by weight of the gravel is also known. The asphalt composition can be determined by the fixed correlation between the amount of bitumen adhering to the gravel and in the mortar, the percentage by weight of the gravel in the asphalt, the fact that the percentage of sand + gravel in the asphalt is constant, and the bitumen content in the mixture with the mortar. Tables, graphs or other aids can be advantageously used. If an incorrect percentage of bitumen is found on analysis of the mixture of bitumen and mortar, it can be concluded that either the percentage of bitumen in the asphalt or the percentage of sand and therefore the percentage of gravel is incorrect. Determination of the percentage by weight of the gravel in the asphalt can show whether the bitumen or else the sand and therefore the gravel is the cause of the incorrect asphalt composition.

The method according to the invention can also be advantageously used in cases in which, for instance, as a result of transportation, the asphalt mixture has separated somewhat, so that the sample is very unrepresentative. Since the relative proportions between the bitumen and mortar are not affected by the separation, the percentage of bitumen in the mortar still gives an idea of the percentage of bitumen in the asphalt. When such percentage is incorrect, the cause is determined by a sample taken from asphalt which has not become separated, in order to determine the percentage of gravel. An idea of the quality of the asphalt composition can therefore rapidly be obtained at a place of use.

For the performance of the method use can be made of an apparatus which is characterized by a rotatably driven drum which can be closed by a cover, has a meshwork generated surface and can occupy three different operational positions, in one of which the drum is at least partly situated in a solvent reservoir. By means of such an apparatus the gravel can be separated from the rest of the sample.

Time can be gained by washing the gravel and extracting the partial sample simultaneously. The method according to the invention enables the information required for analysis to be obtained in about 2 hours, instead of about 30 hours, as in some of the prior art methods.

The apparatus for the performance of the method according to the invention will now be described in greater detail with reference to the accompanying drawings, wherein.

Figure 1:
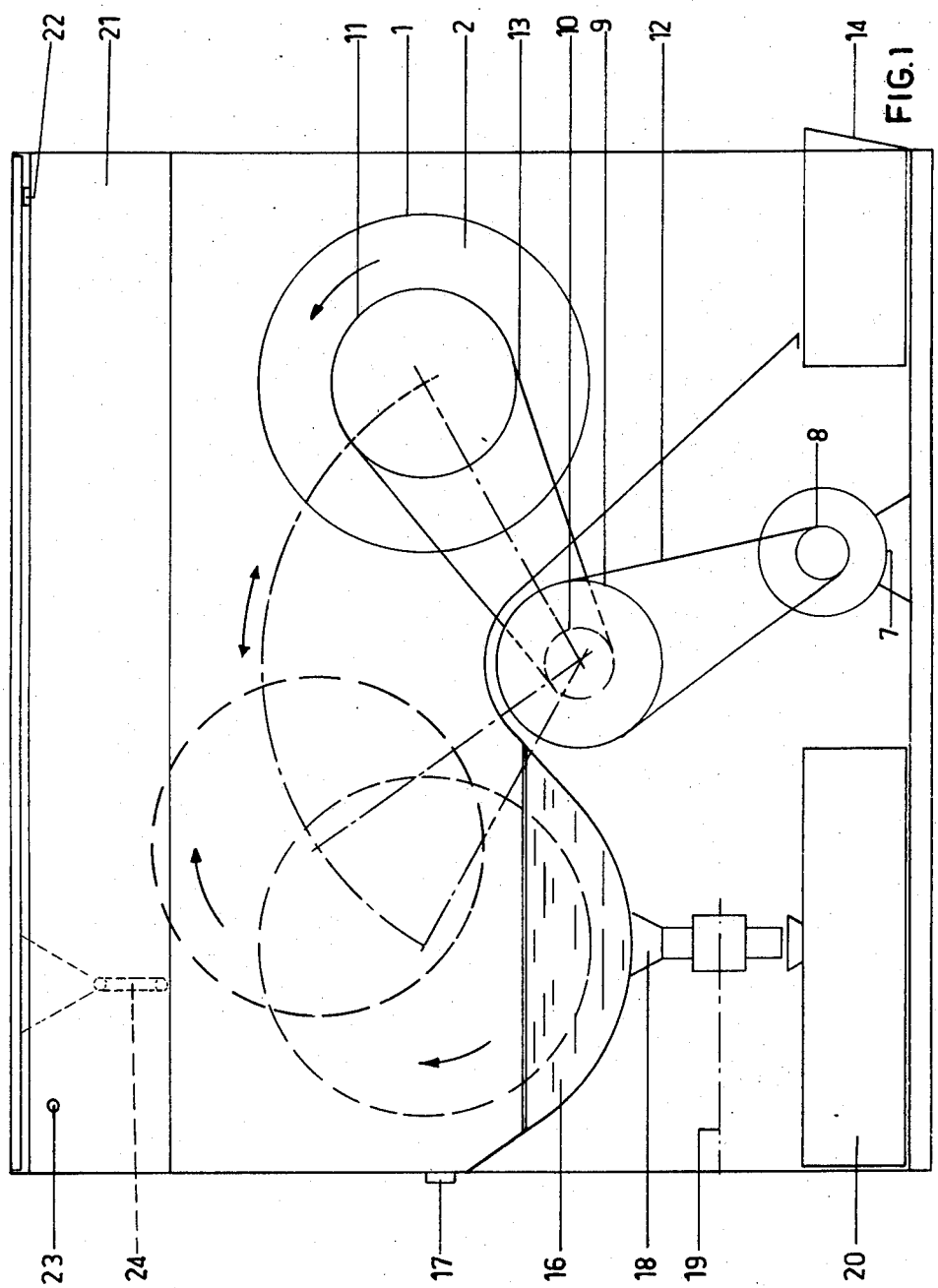
FIG. 1 is a front view of the apparatus according to the invention.
Figure 2:
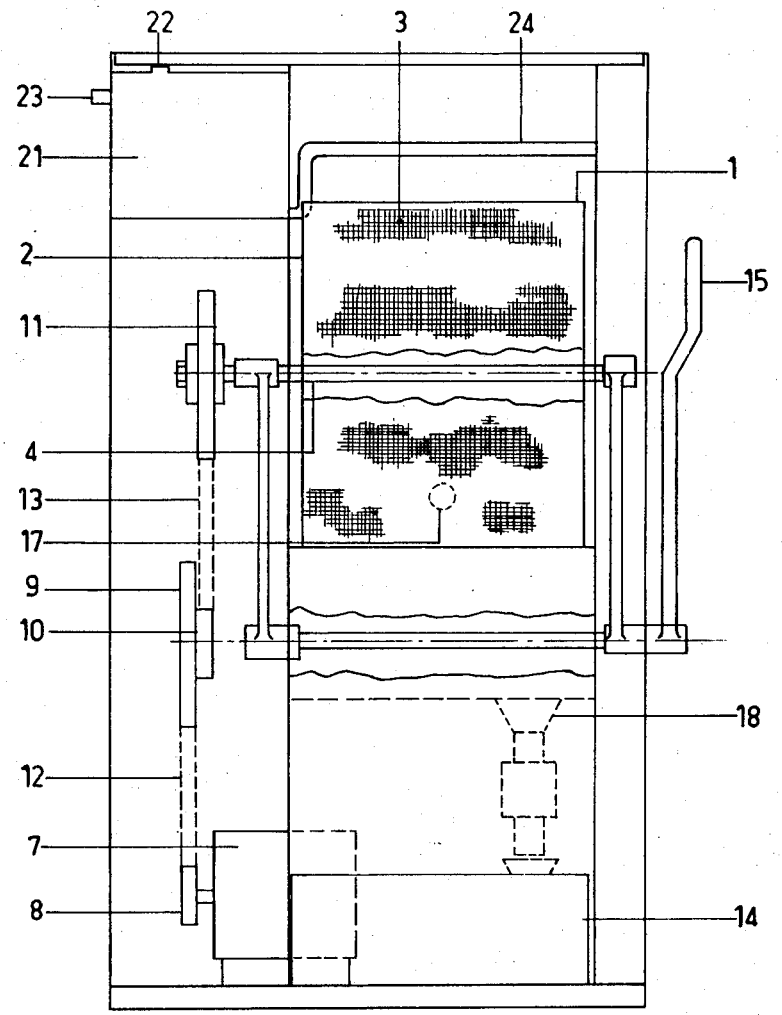
FIG. 2 is a side view of the apparatus according to the invention.
Figure 3:
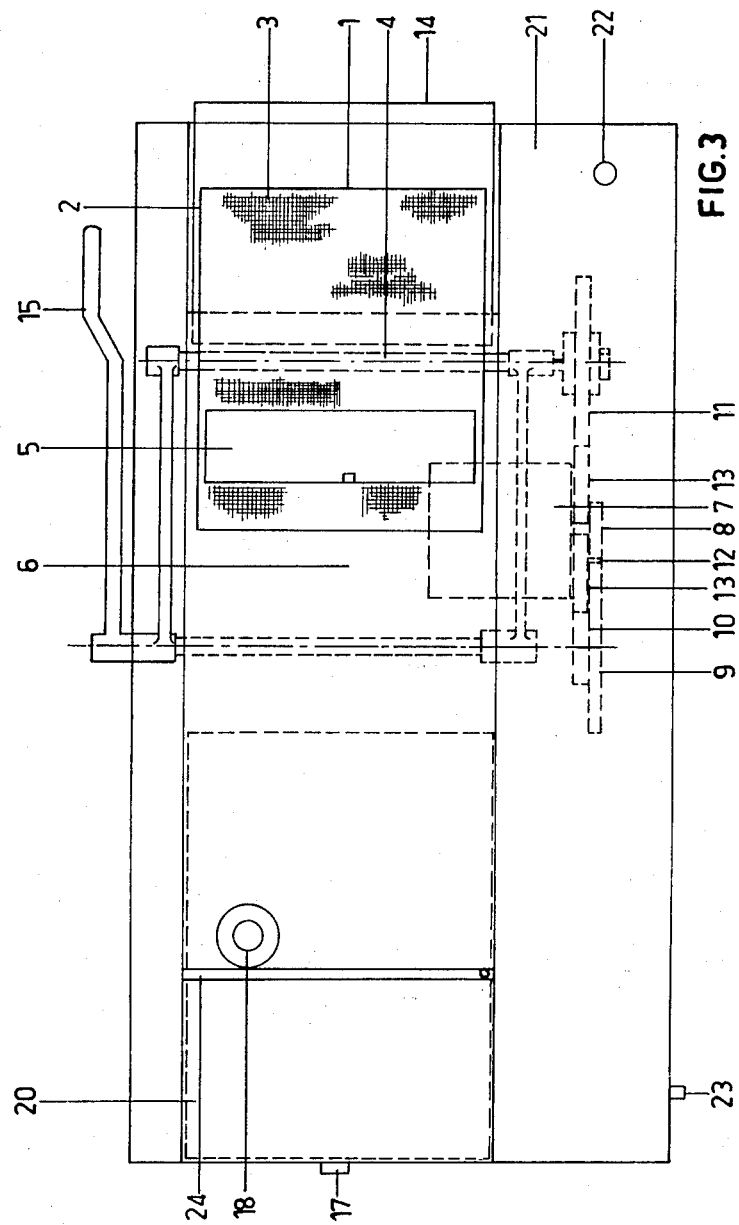
FIG. 3 is a plan view of the apparatus according to the invention.
Figure 4:
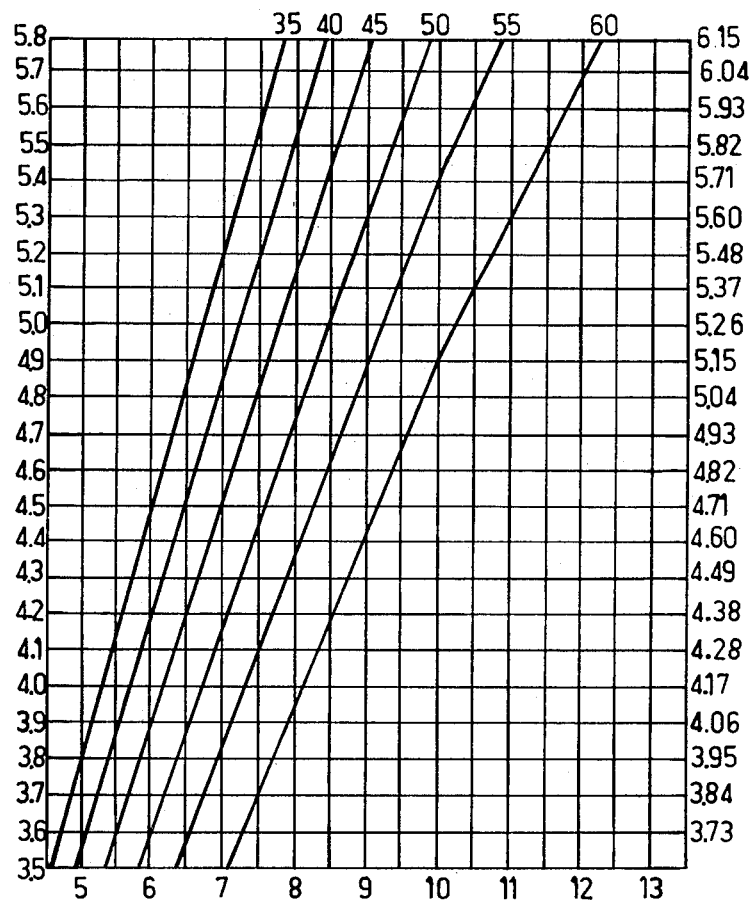
FIG. 4 is a table for determining the relative proportions of the components.

The apparatus shown in FIGS. 1 – 3 consists of a drum 1 consisting of two vertical side plates 2 interconnected all round by a gauze 3 having a mesh of 2.5 mm. The drum is connected to a horizontal shaft 4 around which the drum rotates and has a removable cover 5 which can be attached to the drum by a clamp 6.

The drum must be in the full line position of FIG. 1 when the sample to be investigated is introduced. The drum is driven by an electric motor 7 which can be rotated to either hand by a reversing switch.

V-belt pulleys 8 – 11 are interconnected via V-belt 12, 13. In position 1 the drum is rotated in the direction shown by the arrow. The coarse material (gravel) larger than 2.5 mm remains in the drum, while the fine material (mortar) smaller than 2.5 mm leaves the drum through the gauze mesh and is collected in a collecting tank 14.

The drum is then moved into the dashed line left-hand position of FIG. 1, using handle 15, in which position part of the drum rotates in tank 16 containing solvent.

In this position the drum rotates in the direction shown by the arrow and the gravel is flushed.

The solvent vapors are removed via a suction aperture 17. At the end of the day the solvent is removed via a discharge tube 18 containing a shut-off valve 19.

The used solvent is collected in collecting tank 20. When the gravel is substantially clean the drum is moved into the dashed line right-hand or intermediate position of FIG. 1, using handle 15.

Solvent storage tank 21 has a filling aperture 22.

The storage tank 21 is then pressurized with compressed air supplied via a tube 23.

The pressure forces the solvent through spraying beam 24. As a result, the remaining bitumen is removed from the gravel, while the drum is at the same time flushed clean. The drum is moved back into the full line position, the cover is removed and the gravel is collected in collecting tank 14.

In all its positions the drum rotates at an identical speed of ±40 r.p.m.

What I claim is:

1. The method of determining the relative proportions by weight of the components of an asphalt sample which consists of a gravel component, a mortar component and a bitumen component, which comprises the steps of:
    a. weighing the sample;
    b. separating the sample into a first part which consists of said gravel component plus mortar and bitumen adhering thereto and a second part consisting of mortar and bitumen adhering thereto;
    c. washing said first part to remove the mortar and bitumen therefrom;
    d. weighing the washed gravel of step (c);
    e. separating said second part of the sample into a small partial sample and a remaining portion;
    f. separating bitumen from said small partial sample by extraction to determine the bitumen content of the mixture of bitumen and mortar;
    g. weighing said remaining portion of said second part; and
    h. determining the relative proportions of said components by weight from the weight of the washed gravel determined in step (d), the bitumen content determined in step (f), and the weight determined in step (g).

2. Apparatus for determining the relative proportions by weight of the components of an asphalt sample which consists of a gravel component, a mortar component and a bitumen component, which comprises:
    a horizontally disposed drum having a foraminous cylindrical side wall presenting openings of a size to pass all of said components except said gravel component;
    means for rotatably mounting said drum about its longitudinal axis and for disposition in any one of three laterally displaced positions;
    means for selectively rotating said drum;
    means for collecting mortar and bitumen components passing through said side wall of the drum as same is rotated at one of said positions thereof whereby the gravel component plus adhering mortar and bitumen remain in the drum;
    means for bathing the retained contents of said drum in a solvent bath as the drum is rotated at another of said positions thereof; and
    means for flushing the retained contents of said drum as same is rotated at the third position thereof.

* * * * *